(12) United States Patent
Subrahmanyam

(10) Patent No.: US 9,344,526 B2
(45) Date of Patent: *May 17, 2016

(54) DISK BLOCKING STREAMING

(75) Inventor: Pratap Subrahmanyam, Sunnyvale, CA (US)

(73) Assignee: VMware, Inc., Palo Alto, CA (US)

(*) Notice: Subject to any disclaimer, the term of this patent is extended or adjusted under 35 U.S.C. 154(b) by 2147 days.

This patent is subject to a terminal disclaimer.

(21) Appl. No.: 12/180,417

(22) Filed: Jul. 25, 2008

(65) Prior Publication Data

US 2008/0281884 A1     Nov. 13, 2008

Related U.S. Application Data

(63) Continuation of application No. 10/837,964, filed on May 3, 2004, now abandoned, which is a continuation of application No. 09/751,647, filed on Dec. 29, 2000, now Pat. No. 6,735,601.

(51) Int. Cl.
    *G06F 7/00*         (2006.01)
    *G06F 17/00*       (2006.01)
    *G06F 17/30*       (2006.01)
    *H04L 29/08*      (2006.01)
    *G06F 9/445*       (2006.01)
    *G06F 9/455*       (2006.01)
    *G06F 3/06*        (2006.01)

(52) U.S. Cl.
CPC *H04L 67/34* (2013.01); *G06F 8/61* (2013.01); *G06F 9/45558* (2013.01); *G06F 17/30197* (2013.01); *G06F 17/30233* (2013.01); *H04L 69/329* (2013.01); *G06F 3/0601* (2013.01); *G06F 2003/0697* (2013.01); *G06F 2009/45579* (2013.01); *G06F 2209/549* (2013.01)

(58) Field of Classification Search
CPC .................................................. G06F 17/30233
See application file for complete search history.

(56) References Cited

U.S. PATENT DOCUMENTS

| | | | |
|---|---|---|---|
| 5,247,638 A * | 9/1993 | O'Brien et al. | 710/68 |
| 5,403,639 A * | 4/1995 | Belsan et al. | |
| 5,689,708 A | 11/1997 | Regnier et al. | |
| 6,061,692 A | 5/2000 | Thomas et al. | |
| 6,161,103 A | 12/2000 | Rauer et al. | |
| 6,442,259 B2 | 8/2002 | Culli et al. | |
| 6,446,192 B1 * | 9/2002 | Narasimhan et al. | 712/29 |
| 6,519,605 B1 * | 2/2003 | Gilgen et al. | |
| 6,735,601 B1 | 5/2004 | Subrahmanyam | |
| 6,816,882 B1 * | 11/2004 | Conner et al. | 709/203 |
| 6,970,960 B1 * | 11/2005 | Sarfati | 710/106 |
| 6,990,513 B2 | 1/2006 | Belfiore et al. | |
| 2003/0001887 A1 | 1/2003 | Smith, IV | |

* cited by examiner

*Primary Examiner* — Susan Chen

(57) ABSTRACT

A method for executing on a local user system a body of computer-executable code that resides on a provider system is described. A modified image of the computer executable code is installed to a virtual disk on the local user system, the modified image comprising file structure information. The installing comprises creating each of the local files to the virtual disk with null data, wherein upon installation of the modified image, a plurality of disk blocks assigned to the local files contain a null indicator and do not contain any processable content. A streaming control module senses a request to access the virtual disk, determines whether streaming is indicated to satisfy the request, and transfers to the user system the processable content corresponding to the requested disk block. Streaming is indicated when the request corresponds to one of the disk blocks that does not contain any processable content.

18 Claims, 6 Drawing Sheets

DISK BLOCKING STREAMING

CROSS-REFERENCE TO RELATED APPLICATIONS

This application is a continuation of and claims priority to U.S. patent application Ser. No. 10/837,964 entitled "Distributed Execution of a Program Using Streaming", filed May 3, 2004 now abandoned, which is a continuation of U.S. patent application Ser. No. 09/751,647, filed Dec. 29, 2000, now U.S. Pat. No. 6,735,601.

BACKGROUND

The amount of software available to users is already so great that few can keep track even of what is being offered in any given market segment. To further complicate matters, even well-known and widely distributed software applications are sometimes upgraded so often that consumers are unwilling or unable to buy the latest version.

Another trend that is known to most modern computer users is that the applications themselves are becoming larger and larger, requiring more and more memory space, while often containing many features that only a few users ever care to use. This is usually not a problem for users whose desktop and laptop computers are relatively new, because the size of the memory and storage devices in these systems is typically more than adequate for loading and running the desired applications. On the other hand, the market for small, even hand-held, computers is growing, and many popular applications cannot be loaded into the small memories of these devices. Moreover, the border between traditional computers and devices such as mobile telephones is becoming less clear, as more and more software unrelated to voice communication per se, for example, network access and display applications, is being included within the telephones themselves.

One proposal that allows a user of a local computer system to access and use files (both executable files and data files), in particular, applications, residing in a remote system is for the local system to be a so-called "dumb terminal" that is connected to a more powerful central computer or network of computers. In this scheme, each user's local computer includes a simple operating system and a network connection but has few, if any, installed applications. Instead, the applications are installed only in the central computer, and users run the applications remotely. In other words, users select applications to run, submit data and commands as necessary, and view results on a local display, but actual processing occurs primarily or exclusively in the central system—the executable code of any given application is never loaded into any user's local computer.

One disadvantage of the "dumb terminal" approach relates to security: Because the user's data is transferred for processing to the central system, the user must be able to trust that system, as well as the channel connecting the user's local computer to the central system. Another disadvantage of this known arrangement is that the user is able to select from and access only those applications that are installed in the central system. If, for example, an upgraded version of some application is not centrally installed, then the user simply cannot access and benefit from it.

These disadvantages also affect remote access of pure data. For example, users may wish to examine or analyze portions of a large amount of data, or at least some data set that for other reasons is preferably stored remotely. This might be for the purposes of data mining, or for other conventional forms of data processing and display. In some cases, the whole data base (for example, the human genome) may be far too large to be stored within the user's local computer; similarly, transfer of the entire data base over the channel connecting the user's computer to the data base may be too slow.

Another common way for a user to remotely access both software and data is simply for the user to download the entire desired program (or data base) from a provider. Indeed, as network bandwidth and data transfer rates increase, downloading of software is rapidly becoming a preferred method for acquiring new software products and upgrades, replacing the traditional methods of ordering and physically loading files from a CD ROM disk.

One disadvantage of the currently available system of downloading is that it forces users to buy or at least download large programs or entire software packages, even though they may need only a small portion of their capabilities, or may need the software only for a limited time. Many users therefore prefer to save money and not to install the program at all.

Another disadvantage of existing downloading options is that they assume that there is enough memory in the user's machine to install and operate the software. In general, this assumption is justified, because the memory capacity of new computers tends to grow along with the memory requirements of new software. On the other hand, not everyone has the newest computer. Moreover, there is a separate development in the field of computers, whereby generalized computing hardware and software are being included in ever smaller portable devices such as hand-held or "palm-top" computers and even in mobile telephones. These devices often do not have the memory capacity to load and run standard versions of popular software packages.

One way to allow users of relatively smaller capacity computing devices such as palm-top computers to run software designed primarily for larger capacity machines is to modify, in particular scale down, the software to fit the resources of the smaller capacity devices. By definition, this means that users of such modified software will not have access to the full range of features of the software.

Downloading of applications also presents problems for software vendors, who worry about unauthorized copying. Such piracy is bad enough where applications are delivered on a physical medium such as a compact disk (CD), but is potentially even worse where a user has downloaded an application. Having legally downloaded one copy of the software, a software pirate could either copy ("burn") the software into several CD's, or could in turn make the software available to other unauthorized users through downloading from the pirate's computer.

What is needed is an arrangement that allows a user to access and run, in real time, a potentially arbitrarily large number of applications and/or data that are installed or stored remotely. The arrangement should allow the user to retain local control of the execution of the applications and of the processing of potentially sensitive data. Ideally, the arrangement should be usable even in local computer systems that may themselves not have enough storage and memory space to load a desired application's code, or in other situations where the user chooses not to load the application. No scaling down or other modification of the software should be required; in other words, even users with a small-capacity computing device should ideally be able to access the same full range features available to users with larger capacity machines. The arrangement should also make it at least more difficult, and preferably impossible, to create unauthorized copies of applications. This invention provides such an arrangement.

SUMMARY

The invention provides a method and an associated system for accessing at least one file, such as a whole or partial application, a data set, or any combination of blocks of executable code and/or valid data. Each file is stored within at least one provider system and each file has at least one separately processable file portion.

Requests for access to selected ones of the separately processable file portions are issued by a user system, which is connected to the provider system by a network. These selected file portions are then separately transferred from the provider system to the user system, which includes a local storage device such as a user disk. The user system can then separately process each transferred, separately processable file portion, for example, by executing the code or analyzing the data in the transferred file portion(s).

Each separately processable file portion will normally comprise both file structure information and processable content. Only the file structure information of at least one of the separately processable file portions is initially installed in the user system.

For each installed file portion, a skeleton generation module within the user system then creates an access structure. The access structure includes the file structure information for the respective file portion, as well as access information, which includes a locator indicating a storage location where the corresponding file portion's processable content is stored. Upon each request for access to the processable content of any of the file portions, a transfer request that includes the corresponding locator is then issued by a streaming control module in the user system and is forwarded to the provider system (or some other intermediate storage system) identified by the locator. The processable content of the requested file portions is then retrieved into the user system from the storage location.

One advantage of the invention is that there is no need to modify the version of the application stored within the provider system. An installer is therefore preferably installed within the provider system. This installer generates from the unmodified form of the file in the provider system an installation image of the file; the image includes, for each file portion, the file structure information, as well as an installation flag, but not the processable content of at least one (and preferably all) of the file portions. A streaming control module within the user system then initially installs only the file structure only when the installation flag is in an on state.

One advantage of the invention is that there is no need to modify the version of the application stored within the provider system. An installer is therefore preferably installed within the provider system in order to generate from the unmodified form of the file in the provider system an installation image of the file. The image includes, for each file portion, the file structure information, as well as an installation flag, but not the processable content of at least one (and preferably all) of the file portions. A streaming control module within the user system then initially installs only the file structure only when the installation flag is in an on state.

In order to eliminate or at least reduce the need to transfer file portions more than once, the streaming control module (or some equivalent mechanism) preferably stores, at a respective local storage address within the user system, a cached copy of the processable content of each previously downloaded file portion. The streaming control module then sets the locator in the corresponding access structure to the local storage address. Upon each subsequent request for access to the processable content of any of the cached file portions, processable content of the cached file portions is then retrieved from the local storage address.

The user-side components of the invention are preferably implemented in a virtual machine (VM), which is installed within the user system. The VM has a virtual operating system, a virtual processor, and a virtual storage disk. A virtual machine monitor (VMM) is then preferably installed as an interface between the VM and a host operating system of the user system. The file structure information of the separately processable file portions is then stored in the virtual storage disk. All requests for access to the separately processable file portions then issue via the virtual operating system and all transferred, selected, separately processable file portions are processed by the virtual processor. The VMM intercepts and handles all requests for access issued by the virtual operating system in the virtual machine monitor. Transfer of all separately processable file portions from the provider system thereby remains transparent to a user of the virtual machine.

Another advantage of the invention is that both the virtual operating system and the host operating system may be (but need not be) unmodified, commodity operating systems.

In a "brokered" embodiment of the invention, the operational steps of issuing the requests for access to selected, separately processable file portions, and separately transferring from the provider system each selected file portion from the provider system to the user system all take place via a broker system to which the user system and the provider system are both connected via a network. In a multi-provider configuration of the invention, the broker system selects one of a plurality of available provider systems from which to transfer the requested, separately processable file portions. Here, "available" provider systems are those provider systems actively connected to the network.

In order to deal with the possibility that an active provider may become inactive, that is, no longer connected to the network or otherwise not able to transfer files, the broker system preferably selects as an initial provider, which is also initially a current provider, one of the plurality of available provider systems, from which processable file portions are initially transferred to the user system. Processable file portions requested by the user system are then downloaded to the user system from the current provider as long as the current provider remains actively connected to the network, but whenever the current provider ceases to be actively connected to the network, the broker system selects a different one of the providers as the current provider and continues to select new provider systems as long as needed as current ones become inactive or otherwise unavailable.

The broker system may also include various software modules that monitor and quantitatively measure access requests issued by the user system and completed transfers to the user system of file portions. These modules may then also compile billing information (and/or simple statistical information for reporting purposes) as a predetermined function of the measured access requests and completed transfers. The user may then be billed according to the compiled billing information. The billing function may also be used to determine how much to pay providers for user-requested access to their stored files.

In yet another embodiment of the invention, a larger program, or a system of programs, is decomposed into separately executable portions that are streamed as needed or desired to a plurality of users' computing devices, which execute their respective portions. The skeleton of the program(s) is preferably installed in each user's computing device before streaming.

DETAILED DESCRIPTION

Introduction

This invention makes it possible for users to access and run unmodified software even when they have not installed the entire software package in their own computers. The method in which the invention accomplishes this is new in its own right, but is made possible by particular novel hardware and software components. The conventional way of installing software is first described. Then, the invention is described with reference to a virtualized embodiment of the invention. After that, various particular features are described, which also serves to better illustrate the main idea underlying the invention, namely, piece-wise, user-directed streaming of files, which enables real-time execution of applications and use of data. A networked, multiprovider embodiment of the invention is then described, as well as the configuration in which remote file access takes place wholly or partially via a broker system. Finally, a configuration of the invention in which users are connected via a virtual private network is described.

File Installation in the Prior Art

Figure 1:
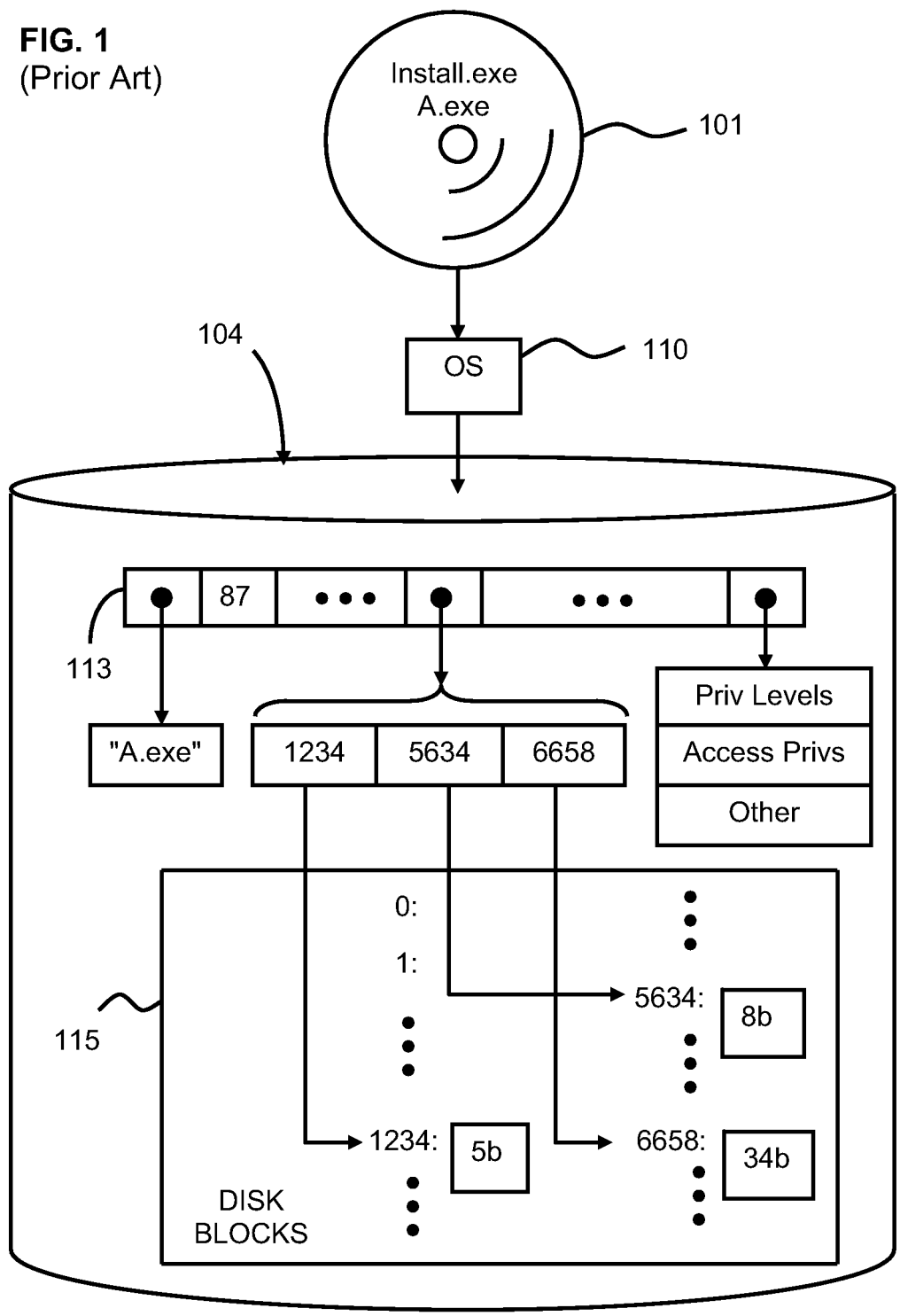
FIG. 1 is a block diagram that illustrates the way in which software is conventionally installed in a user's computer.

See FIG. 1, which illustrates how software is conventionally installed in a user's computer 100. As almost all modern computer users know, some provider of software, usually the vendor, creates one or more CD's 101 on which the necessary data and executable files are stored, along with an installation routine. In FIG. 1, the installation routine is shown as a file Install.exe (using, by way of example only, the common ".exe" file extension to indicate an executable file). Similarly, one file A.exe is indicated. The CD 101 is inserted into the appropriate reader of the user's computer, and the various files are stored in the user's disk 104 (typically a non-volatile mass storage device) under the control of the operating system (OS) 110. Alternatively, the content that makes up the application, and which would be included on the CD, is downloaded in its entirety over some network. Whether installed using a physical CD or downloaded as network content, the installation procedure in the prior art is substantially the same.

Executable files of an application are typically not simply single, contiguous blocks of non-branching instructions. Even when they are, the OS may choose not to store them as such. Rather, a single file (containing either executable instructions or pure data or both) such as A.exe is typically stored as a data structure such as an array 113 and different file portions or "blocks" 115 (for example, memory pages, disk sectors, etc.) in memory, in particular, in the disk. Merely by way of example, the array in the illustrated case includes a pointer into memory where the "name" of the file "A.exe" is stored (for use, for example, in some display visible to the user), one or more elements indicating provider properties of the structure, such as the size "87" (for example, bytes), addresses, which act as pointers, to the various data blocks used (here, "1234", "5634" and "6658"). Fields or pointers will usually also be included to indicate "administrative" information such as privilege levels, user access privileges (such as read-only), and other conventional data. In FIG. 1, disk blocks are stored in a memory portion 115. The three disk blocks 1234, 5634 and 6658 are shown as occupying five, eight and 34 bytes, respectively.

The construction of the data structure and the allocation of disk space for each file, for example, A.exe, of the application is part of the normal installation routine. Once installed, and possibly after rebooting the machine, the specific file structure will be part of the general file structure used by the OS for managing resources and scheduling execution. This is well known in the art of computer science.

The important point to keep in mind here is that the installation and OS load into some allocated disk space the actual code and/or data that make up each file (or analogous subdivision) of the application to be installed. Once properly installed, the application is typically ready to run with no further need for the user's OS to retrieve anything from any external source, including the installation CD 101 itself. If the user takes some action that requires execution of the file A.exe, then all necessary executable code is stored as one or more disk blocks (such as blocks 1234, 5634 and 6658) and can be accessed via the array 113 or some equivalent structure.

"Streaming"—Definition

In the context of transfer over the Internet of audio, video or multimedia content, the term "streaming" is generally taken to mean a technology by which the content is transferred as a continuous flow ("stream") to a consumer's computer in such a way that the consumer is able to hear or view the content before the entire file has been downloaded. This invention enables "streaming" of an application (files, data sets, etc.) in the sense that a user is able to "run" the complete application even though none or at most only part of the actual executable code (or valid data) is loaded into the user's computer. Such executable code is transferred—"streamed"—from a provider into the user's computer via a network as needed. With a high enough transfer rate (bandwidth) this real-time, on-demand transfer is at least substantially transparent to the user, because the application will appear to be operating as if it were fully installed in the user's computer. "Streaming" in the context of this invention thus means real-time, as needed, substantially user-transparent transfer via a network of separately executable (for code) or separately grouped (for data sets) portions of at least one file, program, or other software or data set normally loaded as a whole for execution or processing.

General Structure of the Preferred, Virtualized Embodiment

Figure 2:
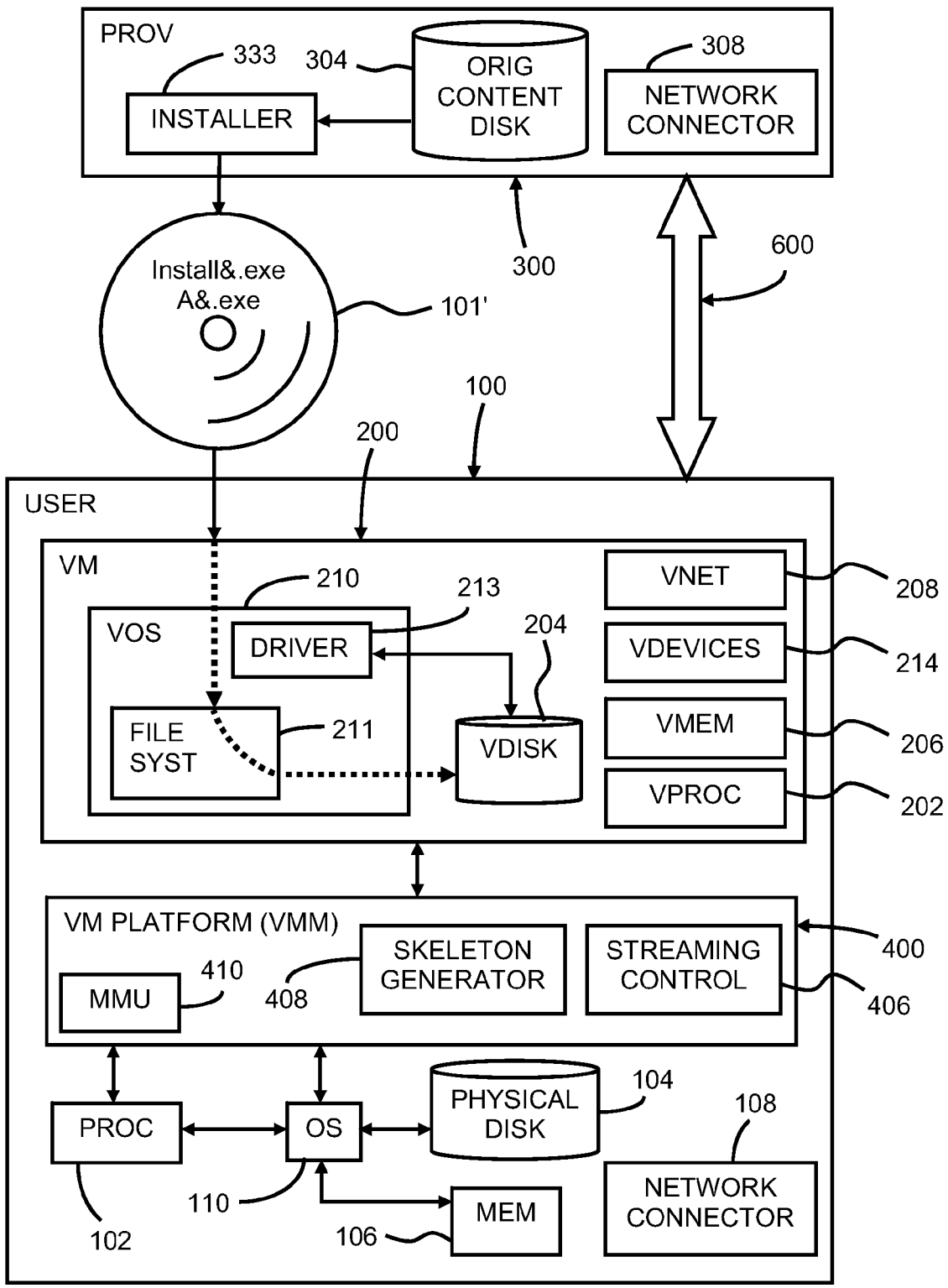
FIG. 2 is a block diagram that illustrates the way in which software, that is, executable and data files, are installed within a virtual machine in the user's computer according to the preferred embodiment of the invention.

FIG. 2 shows the main system components found in the preferred, "virtualized" embodiment of the invention. Here, a virtual machine (VM) 200 is installed within the user system 100, and it is assumed that the "application," that is, the files that the user will wish to access, reside initially on an original content disk 304 within a provider system 300. As will be explained below, it is possible to have any number of user systems and any number of provider systems and it is even possible for a single system to act as both, although a single system will not need to provide content to itself.

User System

The user system 100 will typically be a conventional computer and will thus include at least one processor PROC 102 and related supporting hardware (not specifically shown, because it is well known). The user system will typically also include one or more devices (also not shown, for the sake of simplicity), which will include various conventional input/output devices such as a display monitor, a keyboard, some pointing or cursor control device such as a mouse, trackball, touchpad, etc., and possibly such peripherals as a printer, video and/or graphics card, etc. Non-volatile, mass storage devices such as a memory disk may also be included under the general rubric of "devices," although the mass-storage physical disk 104 is shown here separately because it is referred to extensively.

The user system 100 also includes a memory 106. This memory 106 will typically comprise high-speed system RAM fabricated using any known technology. One advantage of the invention is that it will in many cases make it possible for a user to run even large software packages even though the user system's memory and even mass storage device may not have enough available space to load the entire package.

Even where a user does have enough memory or storage, the user may for some other reason have chosen or been forced not to have the software loaded into his system 100. One example of this might be that the user simply does not wish to pay the full price for a large software package that he will only ever use a subset of, or that he will use too seldom to justify the expense. Another example would be where a user wishes to run some other version of an application than the one residing in his system 100. This invention makes it possible for such users to access the applications they want while avoiding the need to load and/or pay for all of the applications.

As in other computers systems, the user system 100 will typically include some form of operating system (OS) 110 or other component that performs the functions of a conventional operating system. The OS 110 will include any necessary device drivers and, assuming there are any applications loaded into the user system, an application program interface, if such an interface is required. The structure and function of an operating system are very well known and are therefore not described in detail here.

The user system 100 also includes any conventional device 108 for connecting to and transferring data over a network 600. Depending on the type of network implemented, this device might be, for example, a modem, or Ethernet, cable, (A)DSL, TI, optical, etc. adapter. The connection to the network may be general and public, such as where the network 600 is the Internet, or dedicated and proprietary, such as a hard-wired connection to a local- or wide-area network completely within a particular enterprise. As is explained further below, the network 600 may actually be both—a virtual private network (VPN) implemented over a public network such as the Internet.

Broadband network connectors are preferred because they are in general much faster than narrow-band modems. High speed is preferred because most of the implementations of the invention will involve the high-speed transfer of executable files, which will often be so large that waiting for them to be transferred over a slow channel will be impractical and unacceptable.

In the illustrated, preferred embodiment of the invention, the computer system that is presented to the user is the virtual machine 200. As is well known in the field of computer science, a virtual machine (VM) is a software abstraction—a "virtualization"—of an actual physical computer system. As such, each VM 200 will typically include a virtual CPU 202 (VPROC), a virtual mass storage disk 204 (VDISK), a virtual system memory 206 (VMEM), an optional virtual network connector 208 (VNET), and a virtual operating system 210 (VOS), which may simply be a copy of a conventional OS. The VM 200 will typically also include virtual peripheral devices 214 (VDEVICES), in which case the VOS 210 will include corresponding drivers.

All of the components of the VM 200 may be implemented in software using known techniques to emulate the corresponding components of an actual computer. For example, in one prototype of the invention, the virtual network connector 208 was implemented as an Ethernet emulator.

As another, particularly important example, the virtual disk 204 is in practice a software construct, that is, code, that emulates the properties of an actual physical disk. The virtual disk 204 need therefore not have the same properties as the physical disk 104 of the underlying hardware platform on which data is actually stored. The virtual disk 204 will typically be implemented with a virtual address space that is mapped through one or more mapping mechanisms to actual storage locations in the physical disk 104. As such, the virtual disk normally occupies some allocated subset of the physical address space.

Within each operating system is some mechanism for establishing the structure for and allocating storage space to each application that is installed; indeed, maintaining memory mappings and file allocation tables is one of the most important functions of an OS. In other words, each OS will include code that constructs either the structure (the array 113, the disk blocks 115, etc.) illustrated within the disk 104 in FIG. 1, or some equivalent structure. The module that constructs, organizes and maintains this structure is shown in FIG. 2 as the file system module 211.

As is also well known, a driver is usually loaded within the OS for each device that the OS is to handle. Note that, from the perspective of the OS, a mass storage unit is itself a device. Accordingly, a driver 213 is loaded within the VOS 210 to enable the VOS to (virtually) control the virtual disk 204.

If the VM 200 is properly designed, then it will not be apparent to the user that any applications running within the VM are running indirectly, that is, via the VOS 210 and VPROC 202. Applications running within the VM 200 will act just as if the VM would run on a "real" computer. Executable files will be accessed by the VOS 210 from the virtual disk 204 or virtual memory 206, which will be simply portions of the actual physical disk 104 or memory 106 allocated to the VM. Once an application is installed within the VM 200, the VOS retrieves files from the virtual disk 204 just as if they had been pre-stored as the result of a conventional installation of the application.

It is even possible that the VOS 210 may not even be the same as the "real" operating system 110. For example, the products of VMware, Inc., of Palo Alto, Calif. even make it possible for several virtual machines to be running at the same time, each with a different virtual operating system, each of which may be unlike the underlying, real operating system. Similarly, Java "applets" downloaded via the Internet usually are run on a Java Virtual Machine installed to run within a conventional browser—this in part enables such applets to run substantially independent of the underlying hardware platform. Of course, all of the applications and the components of the virtual machine 200 are instructions and data stored in disk or memory, just as any other software, and are executed (either as is or in a translated form) by the actual hardware processor 102. The design and operation of virtual machines is well known in the field of computer science.

Some interface is usually required between a VM and the underlying host operating system OS 110 and hardware (in particular, the processor 102), which are responsible for actually executing VM-issued instructions and transferring data to and from the actual memory and storage devices 106, 104 (FIG. 1). In FIG. 2, this interlace is shown as a VM platform 400.

One form of interface suitable for implementing the VM platform 400 is the type often referred to in the art as a virtual machine monitor (VMM). A VMM is usually a thin piece of software that runs directly on top of a host, or directly on the hardware, and virtualizes all, or at least some subset of, the resources of the machine. The interface exported to the VM is then the same as the hardware interface of the machine, or at least of some machine, so that the virtual OS 210 cannot determine the presence of the VMM. The main function of the VMM 400 is to track and either forward (to the "host" 05 110) or itself schedule and handle all, or at least some, of the requests by its VM for machine resources, as well as various faults and interrupts.

The VMM also usually includes some form of memory management unit (MMU) 410 that establishes and maintains mappings between the address spaces of the virtual disk 204 and the physical disk 404. VM requests for access to the virtual disk 204 are thus intercepted by the VMM and, after conventional checking for possible access violations, the VMM forwards to the OS 110 (or itself handles) a request for access to the corresponding content of the actual physical disk.

This property is particularly relevant to the operation of the illustrated, virtualized embodiment of the invention. Note that execution of any portion of an application within a VM involves access to the corresponding instruction block(s), which will be stored conceptually in the virtual disk 204, and actually on the physical disk 104. This is true not only when the VM wishes to retrieve some data, but also when it needs to execute some instruction sequence, in which case it typically sets an instruction pointer of the virtual processor 202 to the entry point of the sequence. Both cases therefore involve a request for some portion (here referred to as a "disk block") of the contents of the physical disk. In both cases (requests for pure data and requests for instructions, which themselves may include data), the VMM will intercept and handle (or forward) the request.

In some of the figures, and in the discussion of the invention below, it is sometimes shown or stated as though external devices communicate directly with the VM 200. This is simply for the sake of clarity, because this is how the corresponding communication appears from the perspective of the user. In general, however, all communication with any device or software module not only external but also internal to the VM will either take place via or at least be observable by the VMM 400. In particular, any attempt by the VOS 210 to access the virtual disk 213 will be sensed by the VMM, and what is actually returned to the VOS as a result of such an access can be controlled by the VMM.

In some conventional systems, a VMM 400 will run directly on the underlying hardware, and will thus act as the "host" operating system for its associated VM. In other systems, the host operating system 110 is interposed as a software layer between the VMM and the hardware, and still other arrangements are possible. This invention works with all such configurations, the only requirement being that the VM platform should intercept requests from the VM for actions.

The design of VMs and VMMs is known in the art of computer science and is therefore not discussed in greater detail here except with respect to novel features used in this invention. Any known VM and VMM may be installed in the conventional manner within the user system 100 and used to implement the invention as long as they include the software components, described below, that characterize the invention. One working prototype of the invention used the VM/VMM software currently sold by VMware, Inc., mentioned above.

Provider System

Figure 6:
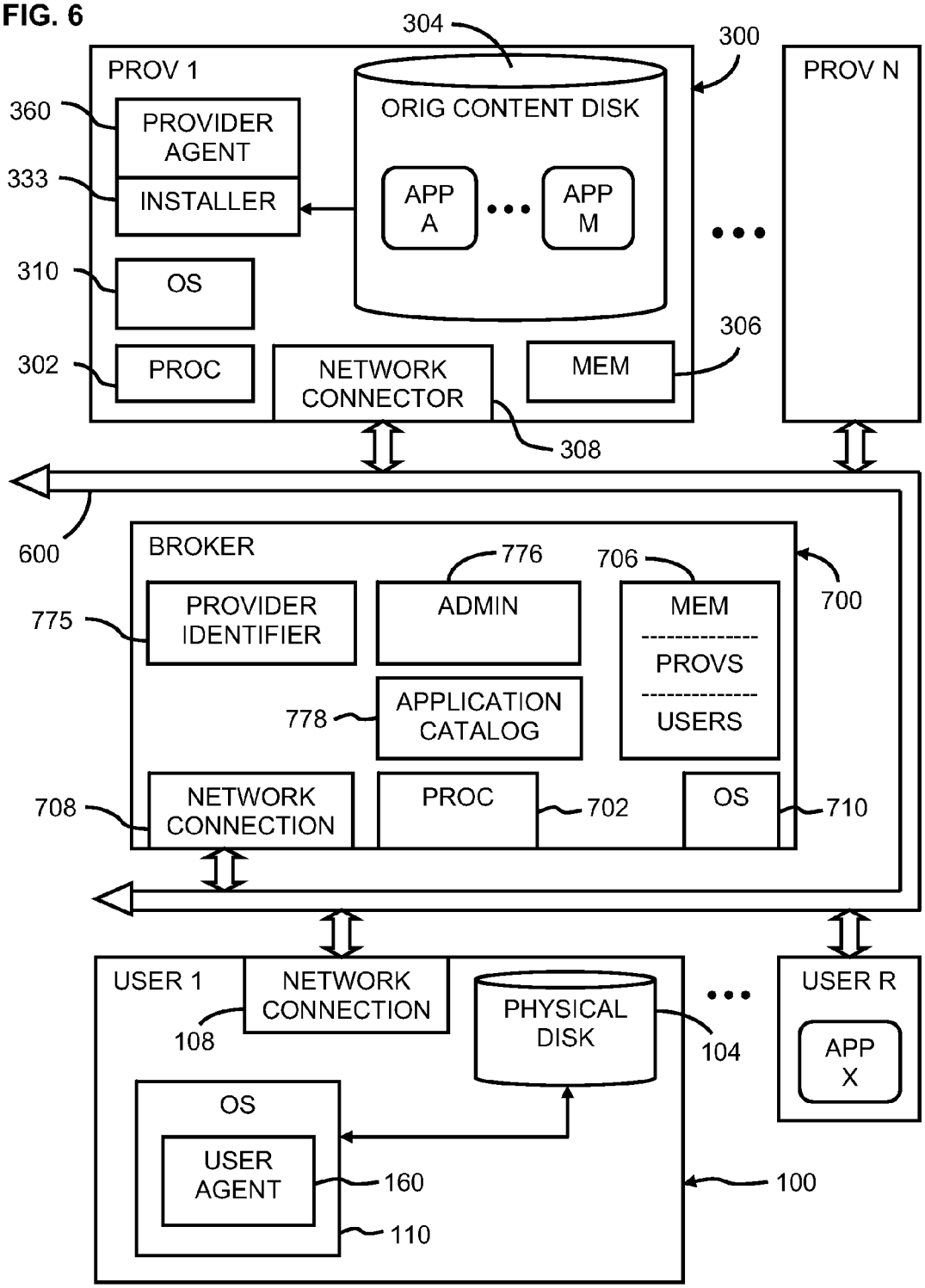
FIG. 6 is a block diagram that shows a configuration of the invention in which at least some files are made available for streaming via a network under complete or partial control of a broker.

A "provider" is any entity, such as a vendor, a distributor or retailer, an aggregator (also referred to below as a "broker"), just to name a few examples, that has at least one file that a user wishes to be able to retrieve into and use in his own system 100. The provider system 300 also has the general structure common to conventional computers, with one or more processors 302, a memory 306, an operating system 310, and related supporting hardware and, devices 314, all of which are illustrated in FIG. 6 but, merely for the sake of clarity, not in FIG. 2. These hardware and software components will have the same general properties as those found in the user system 100 described above. FIG. 2 does show, however, that the provider system includes any conventional network connection device 308, as well as a disk or other memory device 304 that stores the original content of applications to be made available for streaming to users.

It is, however, not necessary for any of these components in any given provider system to be identical to any found in any user system or any other provider system, although they may be. Moreover, as is explained below, in the preferred embodiment of the invention, the main aspects of the invention relating to the user system are implemented within the virtual machine 200, whose requests for actions are generally handled by the VMM 400. Even where virtualization technology is used within the user system, it is not necessary (but would be possible) for any aspect of the provider system to be implemented through virtualization.

Decomposition of Applications

In this discussion of the invention, the term "application" is used broadly to indicate any file or set of files that a user may wish to run or use in his system, but that are not initially resident in the user's system 100. Such files may contain any combination of executable instructions and data and may even be pure data sets. An "application" is therefore any associated set of instructions (code) and/or data that is organized with a file structure and location that can de determined by the operating system or equivalent system software within the provider system. Executable files may include any data specific to the code.

It is not necessary according to the invention for an application to be made up of more than one file, although this will be the normal case. Indeed, one of the advantages of the invention is that it enables "small" systems to have full use of applications, including entire software packages, which may include a very large number of separately executable files or even unrelated and separately stored data sets. In all cases, however, the mechanism for enabling real-time, "streamed" (see below for further explanation), piece-wise execution of applications (or analysis of data) will be the same for each streamed portion of the whole. Thus, the discussion below relating to how "A.exe" is handled and streamed applies generally.

As just one example of the countless number of applications that might be streamed using the invention, consider the common word-processing software Microsoft Word (MS Word). As anyone who has installed this program will realize, MS Word is actually a collection of a large number of associated executable instruction sequences that are stored as files with identifying extensions such as ".exe", and with the various executable files usually grouped into several directories.

When one is typing in a document using MS Word and clicks on the "Save" icon (or presses the corresponding key combination, such as Ctrl-S), the operating system, via the graphical user interlace, interprets this as a request to execute an associated set of instructions that cause the operating system to store the data (and any embedded instructions) that constitutes the current document into the storage location (represented as a drive and path) to which the operating system has assigned the current document file.

Similarly, clicking on a "Font Color (Red)" icon causes instructions to be executed that, among other things, cause the display driver loaded within the operating system to set to red the color information for the portions of the display associated with the selected characters. In other words, as before, the icon is simply a graphical device used to launch the executable file(s) that contains the instructions for changing a font color. Note that this instruction involves both execution of instructions (actually changing the color) and also data (the parameter corresponding to "red").

As these examples illustrate, applications can thus be viewed as a set of one or (usually very many) more executable (and/or non-executable) files and associated parameters. Each user request for an action (for example, clicking on an icon) invokes, via the corresponding application program interface (if needed) and operating system, some executable file, which may in turn branch to and cause one or more other files to be executed. Merely for the sake of simplicity, the term "executable file" is therefore used here to mean the set of instructions, regardless of how they are grouped and stored, and regardless of whatever type and degree of branching is involved, that correspond to a single user request for action. For example, clicking on an "Undo" icon in a word processing program constitutes a single user request for action, although many different groups of associated instructions may be involved. Satisfying the request can be considered execution of a single executable file, even though the actual processing of this command may involve the execution of several different, separately stored and delimited instruction sequences, each forming a portion of the file.

The operating system keeps track of the location of all such executable files using the normal file allocation table (FAT) or similar data structure, which will include a memory pointer to some initial entry point for the respective code sequence. When an application is loaded, the identifiers (typically, memory pointers that can be visualized as corresponding to a drive and path designation) of the application's executable files and their properties (for example, size, type, available data storage requirements, etc.) are usually accessed first to allow the operating system to allocate the required machine resources.

It is thus not necessary for the entire application to be always present in system memory in order for the operating system to know what and where all of its executable components (as well as data) are. Maintaining a file table that points to the entry points of each executable component is enough to ensure that all of the functions of the application will be available when invoked. In other words, a small table in memory of the identifiers and location of all the independently executable components of an application is sufficient to make the entire application available for execution, even if not a single byte of executable code is presently loaded into memory. The array 113 shown in FIG. 2 functions as such a table.

An application, for example, APP A, can thus be defined by the collection of executable files (which may consist of any number of processor instructions, including one) EXE (A, i), where i=1 to however many files are included. For example, assuming that the word-processing application is APP A, then "Save" might correspond to EXE (A,456) and "Undo" might correspond to EXE (A,789).

Note that non-executable data sets may also be indexed and stored as separately accessible units or portions. The invention is able to allow users to retrieve, in real time and upon user demand, portions of such data sets instead of or in addition to the "portions" of programs, that is, the separate executable files or groups of files. One example of non-executable but displayable data that a user might select, even when otherwise running executable portions of an application would be the Help topics and screens that most applications have—these Help topics are indexed as files just as executable components of the application, but they do not require any processing beyond simple display.

Application "Images" and "Skeletons"

According to the invention, what is initially installed within the user's system 100 is not a requested application (or file, or data base, etc.), but rather only its "skeleton." In order to understand this concept, refer once again to FIG. 1. As is explained above, whenever a file is installed within a user system, the operating system 110 constructs the data structures necessary to correctly identify the location in memory or disk of each portion of the file that the user may need to access. For example, if the user takes some action that requires execution of the code of A.exe stored as disk block 1234, then the OS may enter the array 113, locate the pointer to this disk block, and then set the processor (for example, its instruction pointer) to the beginning of this block. The instructions in disk block 1234 are then executed as normal.

Assume now a different arrangement, in which the OS has access to the entire structure of A.exe, that is, the array 113, and that the required disk space is allocated for each disk block, but that the actual storage location for each disk block contains not the actual corresponding code and/or data, but rather some "null" indicator such as "0". For example, in FIG. 1, assume that all five bytes of disk block 1234, all eight bytes of disk block 5634, and all 34 bytes of disk block 6658 are simply filled with zeroes. In this case, the OS would at all times be able to correctly identify (using conventional directories, file allocation tables, etc.) where in storage each separate portion (here, disk block) of A.exe is located; it would know the complete file structure (here, the array 113) of A.exe. If the user were to actually request execution of A.exe, however, no actual corresponding code or data would be present. All that is available at this point would be the "skeleton" of A.exe, that is, the complete set of structural information about the A.exe file(s), but without any actual "information" stored in the respective allocated disk blocks.

Note that it is not even necessary to allocate storage for the "nulled" disk blocks until the user actually needs them, as long as the "real" data is made available for each disk block (or analogous file or memory unit) as needed. Even big applications that include many files requiring large numbers of disk blocks can therefore be characterized completely as a skeleton, which requires relatively little storage, even though the actual code and data are not present until later.

According to this embodiment of the invention, what is initially installed into the user's system 100 is therefore not the full file, application, data set, etc., but rather only its skeleton. Thus, instead of installing A.exe, what is provided to the user for installation is only the image of A.exe, which is shown in FIG. 2 as being A&.exe. Accordingly, the version of A.exe initially delivered to the user is not the complete A.exe, which is stored on the original content disk 304 in the provider system 300, but rather a modified image of it, that is, A&.exe.

In order to minimize the complications involved in generating the image A&.exe, it may be a "complete" copy of the original content disk's version of the respective application, but with zeroes (or other null value) inserted where the actual executable code and valid data would otherwise be stored. This is the preferred method of delivering the image to the user. It would also be possible, however, for the installer 333 to "strip away" all such executable code and valid data upon creation of the installation version—the image—of the application, delivering only the skeleton itself to the user system. After studying the following description of the preferred embodiment of the invention, those skilled in the art of computer programming will know how to modify the invention-specific software modules of the user system to accommodate installation of a "ready-made" skeleton.

Accordingly, a software module referred to here variously as the "installer" or "image generator" 333 is included within the provider system. As its names imply, the installer/image generator 333 creates a complete copy of each application (which term refers here, for the sake of simplicity, to files, data sets, etc., as well) that is to be delivered to any user, but fills all disk blocks (or other units of storage) containing actual instructions and/or data with the null value. Note that it would also be possible, albeit less "clean" and possibly more complicated, simply to insert the null value, or a pointer to some failure handler, into at least one position, for example, the first position, of a data block in order to render it invalid.

The installer may be designed using normal programming techniques. Note that the complete structure and all information for each application will be known to the operating system in the provider, and can thus also be made available to the installer 333. All that is needed is therefore that the installer should insert null values into the respective positions when disk blocks are being read from the original content disk.

There is no need to modify the original copy of the application within the provider. Indeed, this is a general advantage of all embodiments of the invention: There is never any need to modify the application itself. This property of the invention leads to other advantages. For example, the creator/vendor of the original application does not need to do anything in order for the application to be suitable for streaming using this invention. Moreover, the invention can be used to serve legacy applications as well as the most up-to-date versions. Nonetheless, where the provider is also the creator or vendor of the application, it would also be possible for the provider simply to create an "original" installation disk already containing null values in the proper positions. However created, what is provided to the requesting user is the image CD 101' on which the image of the application (for example, A&.exe) is stored.

Installation of Application Images

In order for a user to be able to use the invention, especially in a transparent manner, there must be some mechanism that installs the skeleton of an application into the user's (virtual) system and establishes the various data structures needed to access the skeleton. In the preferred embodiment of the invention, this mechanism is shown as the skeleton generator 408 within the VMM 400. This module may be designed in any known manner, for example as an adjunct to the disk emulation module that will be in the VMM to handle "normal" requests by the VM for access to the disk resource, or as a module within the driver 213.

One advantage of the invention is that an application can be installed in the user system 100 in skeletal, "streamable" form in exactly the same way that one would install the application conventionally: The user inserts a CD into the appropriate drive (or the equivalent content is downloaded over the network) and the installation routine is activated either manually, or using known auto-installation techniques. There are two significant differences however: First, only the skeleton of the application is actually installed. Here, the "image" of the application is what is delivered to the user for installation and the "skeleton" of the application is the structure that is created within the user's system as a result of installing the image.

Second, the installation routine, by setting a streaming installation flag (SIF), indicates to the user system that the application is to be streamed during run time. Thus, one function of the installer 333 is to create a modified installation routine Install&.exe with the general structure provided in Table 1.

TABLE 1

1. Set to HIGH the streaming installation flag of the virtual disk 204
2. Indicate the network address ADR_PROV of the streaming provider system
3. Run commodity installation routine lnstall.exe
4. Set to LOW the streaming installation flag Note that this modified installation routine is a simple embedding of the commodity installation routine, which comes with each respective application, between instruction sequences involving the streaming installation flag. Once again, there is no need to modify the original content of the application to be installed, not even its installation routine. On the other hand, when the commodity installation routine is run within the VM 200, the VMM 400 senses that the installation flag is set ON, and will install only the skeleton of the application. This is described further below.

Figure 3:
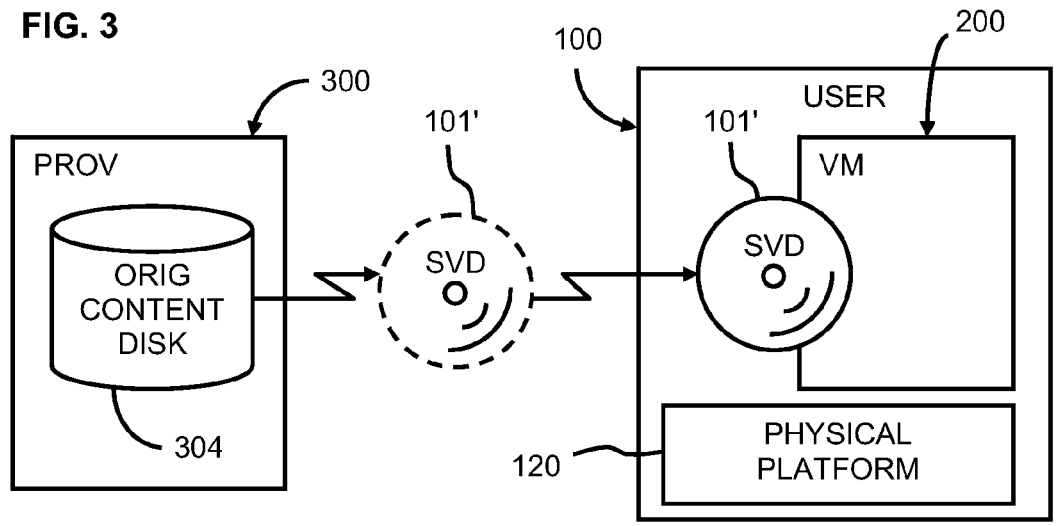
FIG. 3 illustrates the concept of a streaming virtual disk made possible by the invention.

FIG. 3 illustrates the general concept of the virtualized embodiment of the invention: A disk transfer is represented from the original content disk 304 into the VM 200 of a user system 100. In FIG. 3, the various components of the user's "real" (non-virtualized) system are indicated generally as the physical platform 120.

Since the transfer of applications is accomplished through downloading in "pieces" (executable portions defined by the application skeleton), in real time, through user-initiated downloading requests (that are transparent to the user), this transfer according to the invention may be considered to be a "streaming virtual disk" 101', where the "primed" notation indicates that the disk has been modified to include the installation routine lnstall&.exe and has only the application image. Note that this is the case even in the embodiment of the invention (described below), in which the user system does not include a VM: The information from the original content disk 304 is still made available to the user system in a transparent manner, and, as such, transfer still takes place as if the original content disk were effectively installed into the user system.

Streaming Mechanisms

Figure 4:
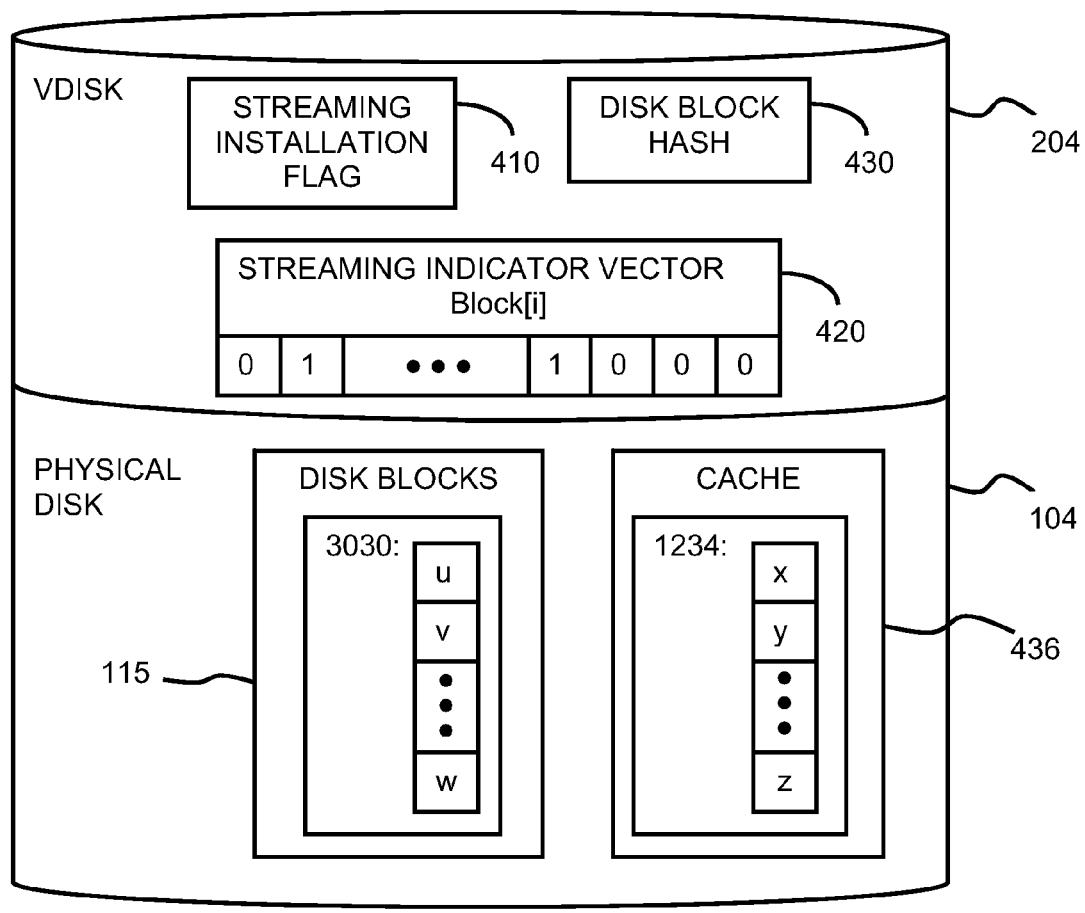
FIG. 4 illustrates various structures in virtual and physical memory used to enable efficient, real-time, piece-wise streaming of files according to the invention.

FIG. 4 illustrates the main mechanisms used by the invention to handle streaming of an application once the respective skeleton has been installed in the user system 100. In FIG. 4, the physical disk 104 and the virtual disk 204 are illustrated together, since in reality the virtual disk 204 is implemented simply a portion of the storage space of the physical disk 104 that the OS 110 allocates and reserves for use as the virtual disk 204.

As FIG. 4 shows, a streaming installation flag 410, a streaming indicator vector 420, and a disk block hash table 430, are preferably stored within the virtual disk 204, although they are controlled by and are functionally part of a streaming control module 406 (FIG. 2) included within the VMM 400.

The streaming installation flag SIF 410 is preferably a single bit that is used during installation of an application image to indicate that disk blocks of the application, at access or run time, are to be accessed initially through streaming. Note that the virtual OS 210 never needs to be aware of (or be modified to accommodate) the flag 410. The use of this flag is described in greater detail below.

The streaming installation flag 410, the streaming indicator vector 420, and the disk block hash table 430 will typically all be data structures used by the emulation code that constitutes the virtual disk. These structures are therefore shown within the virtual disk 204 in FIG. 4 for conceptual clarity—in actual implementations, these data structures may be stored in the physical memory space allocated to VMM 400, and may even be paged back and forth between the virtual and the physical disks.

The indicator vector 420 has an entry, which need be only a single bit, for every disk block forming a separately streamable portion of each application. In other words, for at least each disk block (or equivalent unit) i that is initially "nulled" in the skeleton (having no actual executable code or valid data stored corresponding to the block), the vector 420 has an element Block[i] that is either HIGH/ON (for example, "1") or LOW/OFF (for example, "0"). Thus, if Block[6658]=1, then disk block 6658 must be streamed. If, however, Block [6658]=0, then disk block 6658 is available without streaming.

If streaming is indicated for a given disk block, then the corresponding actual code and/or data is not present (only the skeleton of the block) and the VMM must be able to determine where to find and from where to retrieve it. This is the purpose of the disk block hash table 430.

Figure 5:
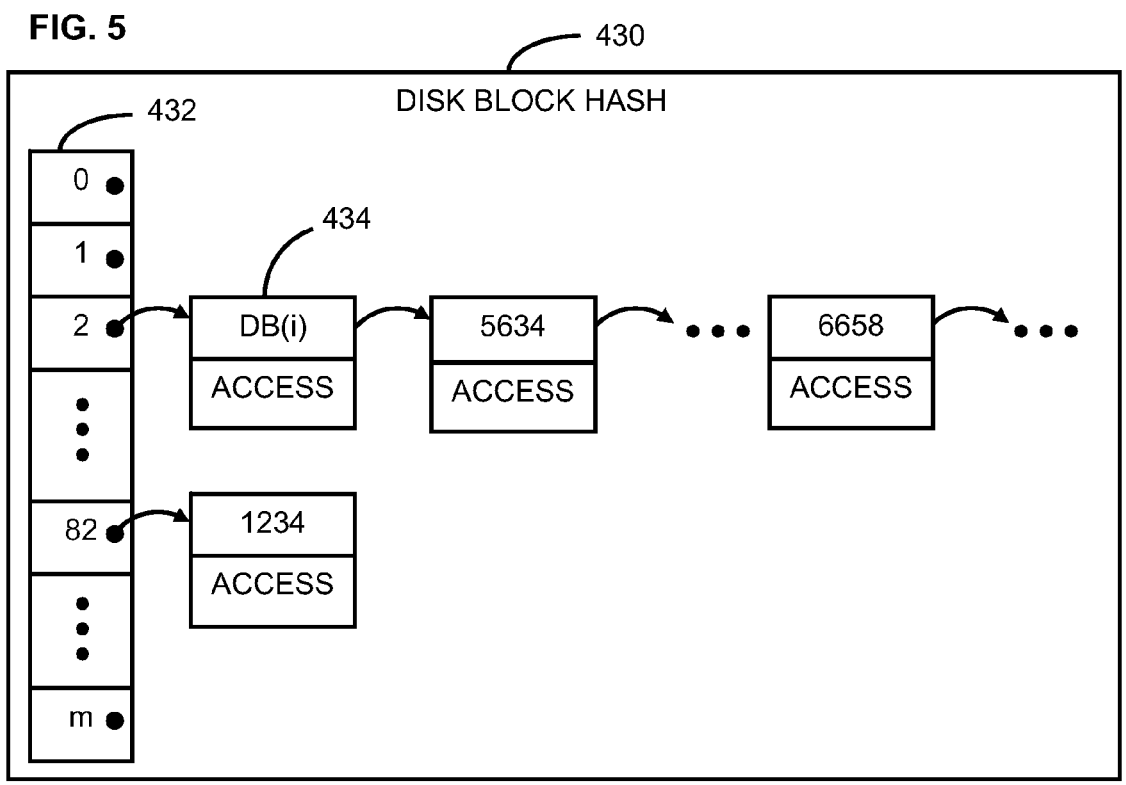
FIG. 5 illustrates a preferred memory structure, namely, a disk block hash, for locating files to be retrieved for active use.

FIG. 5 shows the structure of the block hash table 430 in the preferred embodiment of the invention: A hash vector 432 has elements 0, 1, . . . , m that include pointers (shown as dots and arrows) to pointer blocks 434 that are preferably arranged as linked lists. Each pointer block 434 includes a field DB(i) indicating the number of the corresponding disk block, as well as at least one (and, in most cases several) access fields ACCESS(J), one of which (here, ACCESS(1)) is the remote network address from which the corresponding disk block is to be streamed.

It will in most cases be preferable not to require a separate network address for each disk block, since this assumes that these addresses will remain static in the remote provider system. Instead, each block address will typically be the general network address ADR_PROV of whichever server(s) within the provider system that is assigned the task of handling streaming, with the block number being passed as a parameter. Block addresses will thus preferably have the form ADR_PROV(i) where i is the block number (or analogous identifier).

The server (in particular, the installer 333), upon sensing the request from the user system, may then access and download the proper disk block, which can be identified within the provider's file structure using any conventional mapping between the passed block parameter and the actual location of the block code and/or data. This allows the server to relocate the various blocks according to its own needs using its native algorithms. This also allows the server itself to change network addresses, as long as some proxy is established. Different servers could then also be used to stream given blocks as long as they can map the block parameter and some central server distributes block requests to the various servers that have the required block.

The preferred structure of the vector 432 is, as its name implies, a hash table. Accordingly, a hash function is preferably used to select elements of the vector 432. In this example, the hash vector 432 has m elements, and the hash function is the remainder of the block number when divided by m. Thus, the reference to block number i is stored in the hash vector in element (i mod m) where "mod" indicates the modulus. Assume that m=128. The hash function will then map to element 2 both the disk block numbers 5634 and 6658 since (5634 mod 128)=(6658 mod 128)=2

Disk block number 1234 will, however, be mapped to element 82, since (1234 mod 128=82).

ACCESS(j) may include any number of entries for such other data as I/O control (for example, port number), administrative data (such as billing information), etc. The actual contents and structure of ACCESS(j) will depend on each given implementation and can be determined easily. The only required field is for the remote address, since this is needed to retrieve the needed disk block. As just one example, ACCESS (j) could have n entries as represented in Table 2.

TABLE 2

| j | ACCESS(i) |
|---|---|
| 0 | Network address ADR_PROV(i), where i is the block number |
| 1 | Port number for network access |
| 2 | Encryption parameters |
| 3 | Billing data |
| ... | ... |
| n − 1 | Locally cached? |
| n | Physical disk block offset (or direct block address) |

Skeleton Creation

The fact that only the image of an application (or file, etc.) need be provided to the user system is explained above, as is the advantage of the invention that no modifications to the original content disk are required. Before the application can be run, however, the various streaming mechanisms just described must be properly configured; in other words, the actual application skeleton that is used at run time must be properly created.

Recall that one feature of the installation routine lnstall&.exe is that it sets the streaming installation flag SIF HIGH before the regular installation routine is run. Recall also that, in the preferred embodiment of the invention, the application is assumed to be installed in the virtual machine 200, whose actions are observable by the VMM 400. Upon installation of any application, the VMM (or, alternatively, the driver 213 within the VOS 210, using known programming techniques), performs the operations represented in Table 3.

TABLE 3

1) If SIF is LOW, proceed with installation as in the prior art;
2) If SIF is HIGH, then, for each disk block i to be installed:
   a) Set the corresponding bit in the indicator vector 420 HIGH;
   b) Create a corresponding pointer block within the hash table, including:
      i) Enter the network address ADR_PROV(i)
      ii) Set the "Locally cached field?" LOW (NO)
      iii) Discard or ignore any code and/or data included in the TABLE 3-continued streaming virtual disk for the current disk block, since this
block is to be streamed later.

Streaming Example

In order to better understand the way in which the invention enables realtime, piecewise, user-transparent downloading and execution of applications, that is, "streaming" of applications, consider the following example, which refers to FIGS. 2, 4 and 5.

Assume that the skeleton of an application has been installed in the user's system 100 as described above and that the user, in the course of running the application in the VM 200, needs to run the routine A.exe. Assume further that running A.exe involves execution of instructions assumed to be stored in disk block 6658. Note that the VM assumes that block 6658 is present, since its skeleton is, but that, in reality, no actual code or valid data may be available corresponding to block 6658.

The VMM 400, in particular, the streaming control module 406 (which is preferably simply a module within the normal disk emulation logic for the virtual disk 204) first examines the element Block[6658] of the streaming indicator vector 420 corresponding to the requested block 6658.

If this element (bit) is LOW or OFF, then actual code and/or valid data is already available and stored within the physical disk block. The VMM therefore assumes the respective disk block is available in "real," that is, non-skeletal, form and can be retrieved from normal storage as is, just as it would in a system according to the prior art. For example, FIG. 4 shows a disk block 3030 stored on the physical disk 104 with "real" contents u, v, . . . , w.

Actual code/data for block 6658, however, is assumed here to be not yet present in the user's system. The entry for 6658 in the indicator vector 420 will be therefore be HIGH ("1"), since this block will have to be streamed. Upon sensing the high value, the VMM then enters the disk block hash 430. Assuming the same example as above, where there are 128 elements in the hash vector, the block number 6658 will be mapped to element 2 in the vector. The VMM then follows the pointer from element 2 through the linked list of pointer blocks 434 until it reaches pointer block 6658. It then retrieves from the corresponding access fields (here, ACCESS(1)) the remote network address of disk block 6658.

The VMM then accesses the network in any known manner using the remote network address ADR_PROV(6658). Upon sensing the request for disk block 6658, possibly after verifying the user's right to access this block, the provider system then downloads to the VMM the actual code and/or data corresponding to disk block 6658. The VMM will then forward this block of "real" information to the VOS 210, which may process it in whatever way it intended.

Note that, from the perspective of the VM, the VM has issued a request for disk block 6658 and has received the disk block. The VM, that is, the user of the system, is completely unaware that the block was retrieved via a network from the remote provider system instead of from the virtual disk 204. The VMM will follow this general procedure for every request by the VM for a disk block of the current streamed application. Consequently, the user will be able to run the application as "normal" even though, initially, none (or at most not all), of the application's actual executable code or valid data is in the user system.

The preferred embodiment of the invention also includes certain features that improve performance. Indeed, the use of the hash table 430 itself provides a performance improvement since it would be possible to implement the same function using a different data structure and access algorithm. For example, in order to avoid the (minimal) delay needed to search through a linked list to find a particular pointer block 434 it would be possible instead to build a single multi-dimensional table with a separate row for each possible disk block number. The corresponding entry of the streaming indicator vector 420 could even be included within this table. Such a solution will in general present other problems, however. First, unless some complicated indexing scheme is used to map block numbers to their rows (which is in itself a form of hash function) then the table will, for most applications, need to be quite large; it will also typically be sparse, and would thus be a waste of limited storage space.

Partial Skeletons

It has been assumed above that only the skeleton, that is, the file structure but the processable content—the "real" executable code or valid data—is initially stored for all portions of all files in the image. This is the preferred embodiment of the invention because it reduces the complexity of the installer 333 and of the installation procedure. It would be possible, however, to provide for initial installation of a "partial skeleton," such that actual processable content is included for some files or separately processable portions of files, but only the skeletons of others. This might be the case where the providers want to be certain that some files or file portions are always installed on the user system, for example, some executable file that causes an advertising banner to be displayed.

One way to implement installation of such partial skeletons would be to expand the streaming installation flag 410 to be an installation vector, with, for example, a flag bit for each block being transferred. In effect, such a streaming installation vector would be the same as the streaming indicator vector 420 with respect to the blocks being transferred. The VMM would then store actual, processable content for non-streamed blocks on the physical disk (such as disk block 3030 in FIG. 4) and set the associated bit of the streaming indicator vector 420 to the low state.

Another way to implement this arrangement would be to pre-program the VMM 400 especially to recognize that certain transferred disk blocks are not to be streamed. This might be a suitable method where, for example, the same vendor provides not only streamable applications, but also the VMM.

Block Caching

In the preferred embodiment of the invention, whenever a disk block is downloaded from the provider, not only does the VMM forward the block to the requesting VM, but it also copies it into a cache 450 in the physical disk. As is mentioned above, the ACCESS(j) field of each pointer block 434 preferably includes two entries (shown as ACCESS(n−1) and ACCESS(n)) indicating, respectively, whether the block is locally cached, and where. ACCESS(n) may be an offset from some predetermined cache base address; it may be an address that points directly to the entry point of the block; or it may have any other known structure used for locating a disk block.

As is described above, when a streamed application is being run and a particular disk block is requested by the VOS 210, the VMM enters the disk block hash 430 and, after evaluating the hash function, searches through the linked list of pointer blocks until it finds the remote address information for block. Before accessing the network to request downloading of this block from the provider, however, the VMM preferably first examines ACCESS(n−1). If this entry is set "ON" or "HIGH", indicating that a cached copy of the block is stored locally, then there will be no need for the VMM to download this block anew. Rather, in this case, the VMM retrieves the requested disk block from the cache 450, which it can locate using the offset or direct address information stored in ACCESS(n).

If this caching feature is included, then the VMM must of course set ACCESS(n−1) to the "ON" or "HIGH" state whenever a disk block has been successfully downloaded, and must also enter the proper addressing information in ACCESS (n)—this addressing information will be available to the VMM, since it maintains memory mappings and handles memory management tasks for its VM.

In FIG. 4, block 1234 is shown as having been cached as the result of an earlier downloading. Its corresponding ACCESS (n−1) field will therefore be set HIGH. If the VOS 210 later issues a request for the block 1234, the VMM will be able to forward it from the cache and will not need to stream it from the provider.

Forwarding of cached versions of previously downloaded disk blocks has several advantages. First, it increases speed: Cached blocks are immediately and locally available to the VMM, so that there is no downloading time at all. Second, cached disk blocks may be stored in an unencrypted form for future use even where the originally downloaded blocks are encrypted; this also increases speed without sacrificing security.

One of the main advantages of the invention is that it allows even small-capacity computers to run applications that, in unmodified form, would otherwise be too large to install in their entirety within the computer. Many applications, such as word-processing programs, typically have a large number of executable files that many users will seldom if ever need. By caching disk blocks that the user, via the VM, actually has requested, the cache of disk blocks will gradually grow to include most of the parts of the application that the user actually uses. In cases in which the user only ever uses a small number of files, the cache, assuming it is large enough, may eventually include all of the parts of the application that the user ever needs, at which point additional downloading may not be needed at all, or only rarely.

The version of the application stored within the user's system—with only parts of the application skeleton "filled in"—will in practice be a scaled-down version of the whole application that is very specifically tailored to the needs of the user. Once again, this is accomplished with no need to modify the actual copy of the full-scale application that is stored in the original content disk 304 or otherwise provided by the vendor of the application. Note that a complete cached version of any given streamed application will almost never reside within the user's system. This is so not only because of potential storage limitations but also because almost no users use every feature, that is, every possible executable file and data block, of any standard application. What is stored within the user system will therefore be unsuitable for distribution in the form of unauthorized copies. Moreover, even if it were possible to make a copy of the cache, such a copy would be useless without the proper address mappings, which are established and maintained by the particular user system's VMM.

Of course, it is possible that a user may request downloading of some parts of the application that are needed much less frequently than others. Such infrequently used disk blocks represent wasted cache space. According to one further refinement of the preferred embodiment of the invention, a "decay" or "use" parameter is included for each cached disk block, preferably as an addition to the block itself, or in some other array or data structure. The use parameter could indicate, for example, the frequency of access of the respective cached block during a predetermined period, the frequency of access relative to a statistical average or other function of total accesses to all cached blocks, etc. Whenever the use parameter falls below (or above, depending on what factor is used to determine the parameter) some predetermined removal threshold, the VMM could then set the corresponding local caching indicator ACCESS(n−1) back to the "low" or "off" state and then either unmap and deallocate the corresponding space in the cache 450, or in some other conventional way release the space.

In user systems with very limited storage capacity, the cache 450 might tend to grow too large even when holding only frequently used blocks. This can be determined by comparing the currently allocated size of the cache with some predetermined, maximum allowable size. Conversely, it may happen that a particular user uses mostly only a few files, or only small ones, such that much less of the cache is used than is allocated. In this case, the VMM could monitor the total size of the cache over time and release at least a portion of the cache space that is unlikely ever to be needed.

The skeleton of an application will typically require much less storage (and/or memory) space than would the entire, unmodified version of the application. Even after caching many blocks, the storage needed for the portions of files (file blocks) previously downloaded will usually be much less than for the entire application. Consequently, one advantage of the invention is that the storage capacity of the virtual disk 204, or even the physical disk 104 itself, or at least those portions of these devices that are made available for storing the application, may in many cases actually be less than the size of the unmodified application, yet the user will still in many cases be able to enjoy the benefits of all the features of the application that he ever needs to use.

Advantages of Virtualization

In the preferred embodiment of the invention shown in FIG. 2, applications are downloaded to be run in the virtual machine 200. This virtualization has several advantages, among which are:

The virtual disk 204 is much easier to port than a real disk. One can therefore copy the virtual disk to a new location and mount it into one or more virtual machines. Similarly, the VM platform can be installed conveniently as an integrated "package" just as any other application.

Virtualization enables more flexible specification of a security protocol—the provider can specify a simple or a complex security protocol without requiring changes to the non-virtualized, "real" portion of the user system. This would be particularly useful where billing information is passed over the network.

Because the VMM is a software mechanism, it allows a more flexible specification of the data transfer protocol: Similar to the security protocol, the data transfer itself can happen through many protocols and the provider may run a http, ftp or other transfer service agent. If one is not functioning, then another can be used without any loss of precision; indeed, the provider can use its own transfer protocol if necessary.

The invention can be installed and used with no need to modify the actual operating system 110 or the virtual operating system 210. Both of these may therefore be commodity operating systems.

A virtual machine can be functionally isolated from the underlying system, which therefore protects that system against possible viruses.

Application Brokerage

FIG. 6 shows a system in which any number of user systems USER 1, USER R communicate with any number of provider systems PROV 1, . . . , PROV N over the network 600, via a broker system 700. Each user system and each broker system will preferably have the same components and the same configuration as in FIG. 2, including virtualization within the user system.

The advantages of implementing the invention using a virtual machine within the user system are explained above, and the virtualized embodiment of the invention is preferred even in this brokered configuration. Nonetheless, it is not strictly necessary to implement the invention using a virtual machine. Merely to illustrate this alternative, FIG. 6 shows, instead of a VM being handled by a VMM, a user agent 160 that is installed as a driver within the operating system 110 in order to handle the various modules for skeleton generation and streaming control. The user agent 160 will also establish the streaming indicator vector 420 and the disk block hash 430 directly in the physical disk. The main requirements for the user agent 160 are that it should be able to sense all attempts by the OS 110 to install a virtual streaming disk and to read any disk block that needs to be streamed. Conventional programming techniques for drivers may be used to implement the user agent 160.

As FIG. 6 illustrates, each provider system 300 will typically include one or more applications available for streaming, as well as a provider agent module (which may be incorporated into the installer 333). For example, PROV 1 is shown with APP A, . . . , APP M loaded. Other provider systems will in most cases have other applications loaded, although there may also be significant overlap, that is, many different provider systems may have copies of some of the same applications. It is likely, for example, that many provider systems will have loaded identical copies of the most recent version of the most popular word-processing program. As will become clearer below, this "redundancy," although not required, is used to advantage by the invention.

The broker system (or, simply "broker") 700 will also be a computer system that includes one or more processors 702 and related supporting hardware, a memory 706, a network connection device 708, and an operating system 710. As before, these hardware and software components are analogous to those in the user and provider systems, although they need not be identical to them. The broker system also includes a software component or module referred to here as a "provider identifier" 775, as well, preferably, an administrative module 776. The nature of these components is described below in greater detail. Note that the memory 706 of the broker system preferably includes portions for storing identifying data about which providers ("PROVS") and users ("USERS") are associated with, that is, members of, the system as a whole. The memory 706 need not be a high-speed, volatile storage system, but may also or instead include any known non-volatile mass storage device such as a disk.

There may be more than one broker. In this case, each broker will have either a separate network address, or a separate administrative system may be interposed between the various users and providers, on the one hand, and the different brokers, on the other hand, to determine to which broker each user request (explained below) is to be directed for processing.

Note further that a user may also be a provider. For example, USER R in FIG. 6 is shown as having an application APP X loaded, which, for example, provider PROV 1 might want to access at the same time that USER 1 (or even USER R) is accessing APP B from PROV 1. Indeed, a single system could be operating as a user and as a provider simultaneously, that is, a user of content in a different provider while providing content to a different user system. This is one advantage of this embodiment of the invention: It is easy for existing systems to become "members" of the overall system according to the invention simply loading the necessary agent software modules. The modules themselves then become substantially or completely transparent to the member users and providers.

In the simplest brokered embodiment of the invention, the broker system 700 simply acts as a bookkeeper for provider and users. In this case, disk blocks are streamed as before, but administrative information such as the billing information in the ACCESS fields is transmitted via the network to the broker, preferably along with an identifier of the current user and the number of blocks to be streamed (or other billing parameters). The broker then administers any predetermined billing scheme.

The broker system 700 may also act as an intermediary between each active user and each active provider, that is, systems that are currently involved in streaming. In this case, the remote address field ACCESS(1) of the pointer blocks 434 of the hash table 430 would in this case point to a network address of the broker, which would then decide (see below) from which provider the requested block is to be streamed, would download this block, and would pass it on to the requesting user.

The broker system 700 preferably also includes an application catalog 778, which may be a simple table stored in memory, and whose purpose is to identify for the broker 700 which applications or data sets are available for streaming from any of the providers. This catalog may be compiled and updated in different ways. The simplest way is for providers to deliver virtual streaming disks (with the lnstall&.exe routine and application image) directly to users as described above, but with the network address to the broker for at least billing purposes. Note that it is also possible, in all embodiments of the invention, for the entire virtual streaming "disk" to be a single, large downloadable file or application; in other words, each streamable application's image could be downloaded instead of installed using a physical CD. This is of course a well-known technique and any modifications to the installation routine (for example, there is usually no automatic installation of downloaded applications) will be obvious to skilled computer programmers. Each provider would then directly inform the broker system that it has made the particular application available for streaming from the provider's system; alternatively, the broker system itself could store images of all applications to be made available for streaming, which could then be downloaded (perhaps sold) to users upon request, just as users can now download many applications over the Internet.

It would also be possible for the broker to determine application or disk block availability in a more dynamic fashion. For example, when the provider agent 360 is first installed in a provider system, it could scan the existing file allocation table set up by the operating system 310 or equivalent structure and download this to the broker system when the provider system first logs onto the network. The broker system could then update the catalog 778 either at predetermined, scheduled intervals, or whenever the provider system again logs onto the network, or when triggered by an update request from the broker. The main purpose of the application catalog, if needed at all, is to enable the broker system to present to any member user a list of applications that may be available for streaming.

As will become clearer below, there is no guarantee that a particular requested disk block will be available to a user system at any given time, or, indeed, ever—the provider system that has the original content of the application may not be connected to the network, or may have removed or upgraded the application on its own disk. As the number of member providers increases, however, so too will the number of available applications, or at least the number of potential providers for any given disk block of a particular application. In this case, if a user system requests transfer of a disk block via the broker, the broker first identifies which, if any provider is currently logged into the system ("on-line") and then forwards the request to that provider; if no provider is available, then the broker will forward any standard error message, which may then be displayed for the user.

The broker system could also determine which providers are available to stream a requested disk block (or application image) completely dynamically, using polling techniques described below. This would eliminate any need to maintain a complete listing of potentially available application images. Because different provider systems will usually be connected at different times to the network 600, and thus to the broker system 700, and because different applications might get installed in and uninstalled from any given provider system at any time, the application catalog may not be completely accurate at any given time. The application catalog 778 may therefore instead be a dynamic list of all application images available for downloading, or disk blocks available for streaming from all provider systems that are connected to the network and broker system at any given instant.

The broker system 700 could also be the broker for application images, as well as the intermediary for streamed disk blocks. In this case, after contacting the broker system 700, a member user (one in whose system the user agent 160 has been loaded) could first select a desired application, say, APP A from an on-line list. The broker system then locates at least one provider system that is a member, that has APP A installed, and that is currently logged onto the network 600. Once found, if the broker does not itself have a stored copy of the application image, then broker system downloads from the located provider system the application image of the requested application. Once the application image is installed, then blocks may be requested and streamed as before.

Identifying Available Providers

The broker system needs to determine whether a disk block or application image requested by a user is available for downloading. The broker system 700 may determine this in different ways. One way is for the broker system to maintain a table, for example in the provider identifier module 775, of all member provider systems (more specifically, their network addresses) along with which applications each have available for streaming. This list could then be cross-referenced with a list of all providers currently connected to the network; such lists are normally established and continually updated by any standard network server (which the broker system can be implemented as). At any given time, the broker system would then know which applications (and thus corresponding disk blocks) are available on which provider systems and could select one for streaming according to any predetermined protocol.

One disadvantage of this solution is that the list of available applications for the various provider systems will become less and less complete and accurate the longer the time is between updates of the list. For example, if a provider installs a new application, or upgrades an already installed application, then the broker system's application availability list will not reflect this until the broker system performs some scheduled or otherwise triggered audit of that provider system.

The method used in the preferred implementation of the invention avoids this problem simply by polling the provider systems (in particular, their respective agents 360) connected to the network whenever a user system requests streaming of a disk block for a particular application. Polling may be done in any order, for example, according to the time when each provider system connected to the network and broker system. It would also be possible to implement a "preference" system, possibly with several different levels, according to which providers pay extra to be polled early. In a system where providers are paid for allowing their installed applications to be streamed to users, a provider system that is polled first would have increased revenue compared with a provider system that seldom streams installed applications. Data concerning any given provider system's preference level (which would then be accessible by the provider identifier 775) could then be maintained in the administration module 776, along with other administrative data such as billing information.

As soon as a provider system is found that has the requested application, the broker system may establish the streaming link between that provider system and the requesting user system in any conventional manner. If no provider system is on-line with the requested application, and the requested disk blocks are therefore not available, then the broker system preferably sends a message to this effect to the requesting user system. The user may then try again later.

It may happen that a provider system currently streaming an application to a user system might become inaccessible during the streaming procedure. For example, a provider may simply decide to log off of the network, or there may be a failure in the network connection. The likelihood of loss of access during streaming is increased by the fact that the provider agent 360 and the streaming process itself may be, and preferably is, completely transparent, that is, invisible and automatic, from the viewpoint of the user of the provider systems. One other advantage of the polling technique is that it allows the broker system to substantially seamlessly handle such disconnects": If a provider system currently streaming application blocks leaves the network, then the broker system can simply poll those provider systems that are still connected to the network until it finds another that has the same application; requested disk blocks can then be streamed from the new provider system as before.

Pay-Per-Use Execution

As is mentioned above, the invention may be implemented in a commercial model. In one version of this model, users are billed for each use of each downloaded application image and/or disk block (or analogous downloadable unit). Since each request for an application component is handled by the broker 700, the broker could debit the respective user's account whenever a block is successfully transferred. The broker 700 could then distribute any money thus collected to the providers, possibly less any brokerage fee, using any conventional disbursement system.

Billing of users could be based on any or all of several parameters, such as access time, the amount (for example, number of packets) of information transferred, the number and/or type of data or executable files downloaded, etc., or even on combinations of these parameters. Billing may be arranged in any known manner, such as deducting from a pre-deposited balance, or charging to a credit card number in the user's account file. Billing could even be based on a flat fee, similar to the way in which one may purchase a general, yearly renewable copyright license to collections of music. Regardless of the billing structure implemented, if any, the broker 700 can then monitor and store information about user access, for example, within the administrative module 776, which may thus also serve as a billing and account manager.

At the end of any predetermined billing period (or continuously, if preferred) the broker may then compile both a billing statement for each user, and also a usage statement for each provider. Because the broker 700 according to the invention is providing a service to both the users and to the providers (especially in the cases where the providers are paid for streaming access to their installed applications), a brokerage fee or percentage may also be deducted from any amounts to be disbursed to providers. This may also be accounted for within, for example, the administrative module 776.

Note that one advantage of the invention is that, by setting the per-use fee low enough, users can be given access to those portions of applications they actually need at a much lower cost than the cost of the entire application. Users can thus enjoy the benefits of the most advanced software, or latest upgrades, without having to buy the complete package.

Software makers may also benefit from this invention in several ways: First, if a software maker itself joins the system according to the invention as a member, and thus set up computers of its own to act as providers systems, it would be able to receive at least some revenue from users who otherwise would not buy and use the software at all.

Software makers could also make "trial" or "beta" versions of new software available for streaming via the broker 700, in which certain features are not made available to users. For example, the maker may not have finished coding a particular minor feature, or may have discovered a serious "bug" in some program module, but wishes the other features to be made available to external testers. Note that exclusion of features and modules is easily accomplished simply by not including these at all in the application image—stripping off of information regarding unavailable disk blocks could be done by the installer 333 using the same techniques that enable it to "null" disk blocks. Alternatively, since the broker system (if included, otherwise, the installer 333) preferably receives all requests for transfers disk blocks, the broke or provider system's installer can compare any request against the exclusion list and decline to provide streaming. Note that even in this case, as in the normal case, it would not be necessary to modify the actual code of the application itself; rather, the providing system (provider or broker) could simply inform users by suitable screen displays that a particular application component or disk block is available only to non-trial users. In implementations in which requests for executable units or data blocks are passed directly from a user to a provider, or are passed without modification by the broker, then the provider agent 360 or installer 333 can simply refuse the transfer.

Many makers of popular software are forever worrying about violations of their various licensing agreements. This invention alleviates this widespread problem in at least two ways. First, because all remote user access to applications takes place (at least selection of a provider and designation of which files are to be streamed) via the broker 700, the broker may be made a single point of monitoring for any violations. A flat-fee or per-use licensing arrangement can therefore be easily implemented between the broker and any software makers as needed. This fee can then be passed on by the broker's billing routines to either the providers, the users, or both.

Second, the invention makes it possible for users to test new software in their own systems before they buy, yet in an authorized and controlled manner. Depending on the fee structure for using the invention, users would therefore not be as tempted to violate licensing agreements or copyright, and would be less likely to risk loading and running possibly risky, pirated copies of the maker's software.

Broker as Aggregator

The common usage of the term "broker" is to describe an entity that typically adds no value to whatever product or service that is being provided to buyers, but rather that simply purchases from a seller, sells to a buyer and keeps the difference between the purchase and sales prices as profit. In contrast, an "aggregator" typically purchases services from service providers, and then builds more composite services by combining them with some of his own. What the aggregator sells is then be the value added composite service. In the context of this invention, the term "broker" is to be understood to encompass both of these types of intermediaries, since the broker system according to the invention may also play the role of an aggregator—the invention allows for aggregators just as much as it allows for brokers.

Unmodified Applications

Note that there is no need, using any embodiment of the invention, to modify any application just to make it available to users. Even where certain features are excluded from software made available only on a trial basis, the software itself needs no modification; rather, as is mentioned above, a simple feature (file) exclusion list could be provided to the broker system or stored within the respective provider, which is then used to decide which existing files will not be made available for streaming to users.

Transparent Execution and "Leasing" of Streamed Applications

As is discussed above, users of the invention can access and run applications in real time as if they were installed in their machines, even if, in reality, the actual executable files making up the application take up zero bytes in the user's system. The entire system according to the invention is therefore transparent to the user, except in the case where the network connections are slow and transfer rates are so low that execution delays are noticeable.

In most situations, most of the time, most computer systems are using well less than 10% of their CPU's available processing ability. Moreover, even with nonbroadband network connections, most of the time the connection is being utilized far below its capacity. Streaming of disk blocks can therefore usually take place as a transparent "background" operation within the provider 300. Thus, the owner of a provider system could be doing her own work on her computer unaware (or, if the broker gives notification of on-going streaming, at least substantially unaffected by the knowledge) that, at the same time, an application is being streamed from her computer to a remote user. In effect, the invention thus makes it possible for the provider to "lease" or "lend" not only entire or partial applications stored within her provider system, but also processing cycles of her CPU. In the commercial model described above, providers can therefore even be making money without even knowing it, simply by making their already installed applications available for streaming to others, via the broker 700.

Application Warehousing

In the discussion of the invention above, it is assumed that the broker 700 and the provider 300 are separate systems. This is not necessary. Rather, it would be possible for the broker system 700 itself to store (for example, as part of the application catalog 778) original content applications, and include an installer such as 333 to generate images, which are made available for installation (and, after installation, piecewise streaming) by the user upon demand. This configuration is illustrated in FIG. 7, in which the functions (and related software modules, shown in FIG. 1) of a broker and a provider are combined in a single central system 800.

In other words, in this scheme, each user 100 would address the central system 800 and download desired applications directly from it. The administrator of the central system would thus use any known method to load applications into the central system. The central system would then act as an application warehouse and would stream warehoused applications and data sets to users as described above. The central system 800 could thus also be used to directly "lease" software to users.

One disadvantage of warehousing applications in a single central system is of course that is requires the administrator of the system to be aware of and obtain copies of all software that is to be made available. This may be sufficient if only certain applications are intended to be made available for streaming, for example, if they are the various software products of the central system's administrator or owner itself. One way to increase the number of applications available to users would be to store only certain ones centrally, with the others being made available from providers as in the preferred embodiment of the invention described above.

Figure 7:
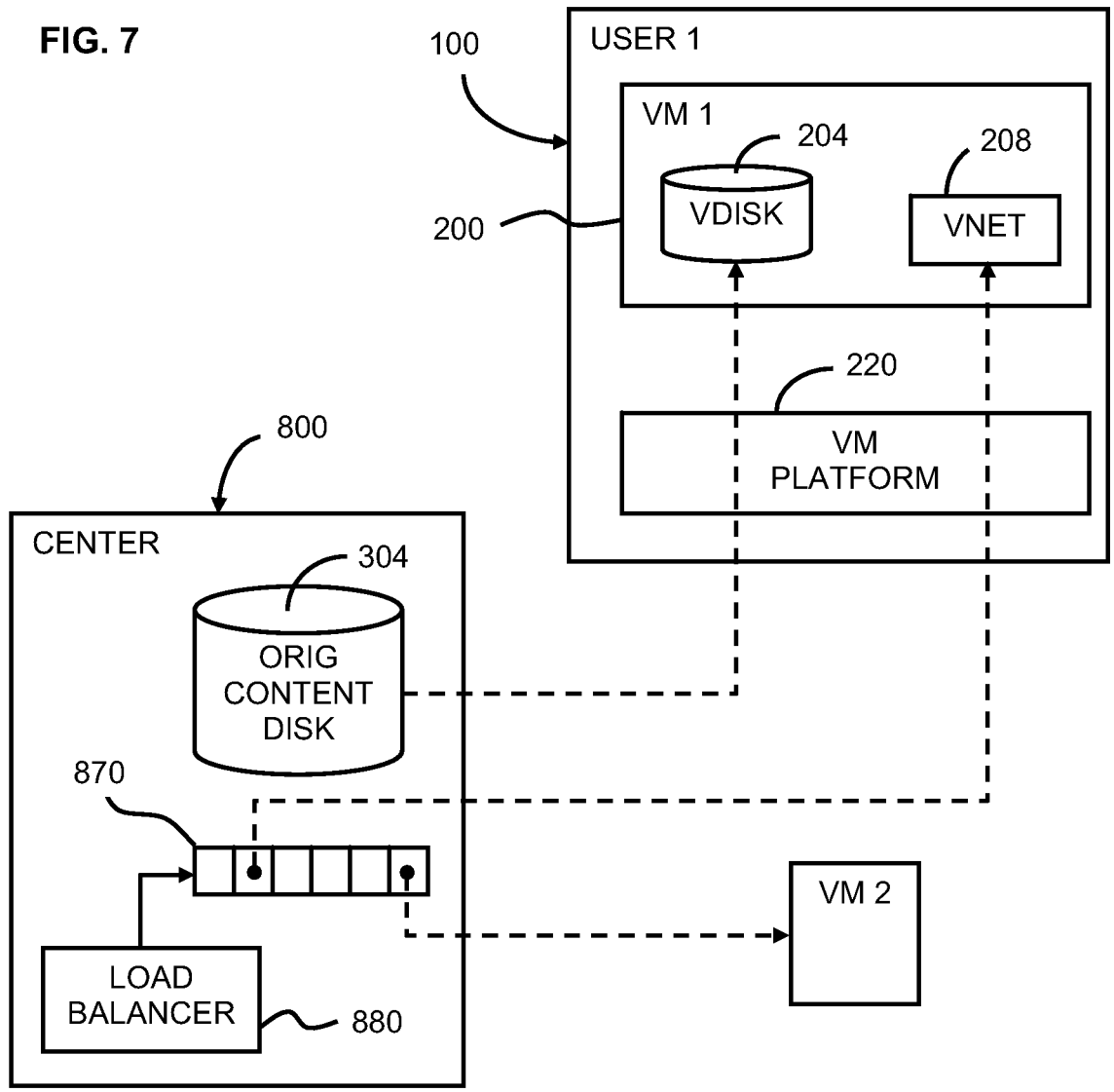
FIG. 7 illustrates an embodiment of the invention in which different users communicate with each other peer-to-peer via a virtual private network.

In FIG. 7, the users are shown as running virtual machines (VM1, VM2). For the reasons given above this is advantageous, but is not necessary to implement a central broker/provider configuration. In FIG. 7, the connection between the various users (two of which are shown) is implemented using portals 870 of a virtual private network. The demand for access to the VPN is regulated using a conventional load balancer 880.

Distributed Execution

The embodiment of the invention illustrated in FIG. 7, that is, with a single central broker/provider, is also advantageous in cases where the execution of a program is "distributed" among several member users. In these cases, either different "pieces" (executable portions) of a single program, along with associated data, could be transferred to member users, or different cooperative programs of a single project could be transferred (possibly also piece-wise). The invention is particularly useful where the application as a whole, or the data set on which it operates, is very large, but can be decomposed into separately executable portions or blocks, or for some other reason is not suitable for loading in its entirety into one or more of the member user systems. Security of such distributed execution can be maximized by implementing the VPN connections shown in FIG. 7.

One example of such a distributed processing application is the analysis of data collected in order to search for extraterrestrial intelligence. Quoting from the current web site of the project administrator, "SETI@home is a scientific experiment that uses Internet-connected computers in the Search for Extraterrestrial Intelligence (SETI)." Users participate by running a free program that downloads and analyzes radio telescope data.

For some computers, the analysis program may be too large. In most others, the entire data set to be analyzed will certainly be too large to be stored. Using the present invention, the image of the analysis program could be installed, so that only those components (disk blocks) that are actually needed by a particular participating user would ever need to be loaded into that user's system. Similarly, no actual valid data to be analyzed would need to be loaded initially into the user's system. The user could then stream in data according to the storage capacity of his computer, with no need to accept large data sets all at once.

I claim:

1. A method for executing an application in a virtual machine running on a local user system, wherein the virtual machine accesses a virtual disk, the method comprising:
    installing a modified image of the application onto a file system of the virtual disk, wherein the modified image does not contain executable code or data of the application;
    updating, during the installation of the modified image, a data structure maintained by a virtual machine monitor (VMM) of the virtual machine to indicate that contents for each disk block allocated by the file system to store portions of the modified image of the application that should contain executable code or data should be streamed from a remote location; and
    consulting the data structure by the VMM upon a request of a disk block during execution of the application in the virtual machine to determine whether to stream the content from a remote location.

2. The method of claim 1, wherein:
    the local user system comprises a general purpose computer system having virtualization software, the virtualization software logically residing and interfacing between a physical host platform and the virtual machine; and
    the virtualization software includes a streaming control module and presents the virtual disk to the virtual machine as a physical disk.

3. The method of claim 1, further comprising:
    upon determining that a requested disk block should be streamed, identifying a network resource from which to obtain contents corresponding to the requested disk block, the identifying of the network resource comprising accessing a data structure that maps the disk block to a remote network address from which the content corresponding to the disk block can be streamed.

4. The method of claim 3, wherein the data structure that maps the disk block to the remote network address is a hash table.

5. The method of claim 1, wherein the data structure comprises a bit value corresponding to each disk block of the virtual disk, each bit value indicating whether a corresponding disk block assigned to the application does not contain any executable code or data.

6. The method of claim 1, wherein the modified image of the application comprises a plurality of files and at least one of the files contains executable code or data of the application.

7. A tangible machine readable medium embodying computer program instructions for executing an application in a virtual machine running on a local user system, wherein the virtual machine accesses a virtual disk, the computer program instructions causing the local user system to perform a method comprising:
    installing a modified image of the application onto a file system of the virtual disk, wherein the modified image does not contain executable code or data of the application;
    updating, during the installation of the modified image, a data structure maintained by a virtual machine monitor (VMM) of the virtual machine to indicate that contents for each disk block allocated by the file system to store portions of the modified image of the application that should contain executable code or data should be streamed from a remote location; and
    consulting the data structure by the VMM upon a request of a disk block during execution of the application in the virtual machine to determine whether to stream the content from a remote location.

8. The tangible machine-readable medium of claim 7, wherein:
    the local user system comprises a general purpose computer system having virtualization software, the virtualization software logically residing and interfacing between a physical host platform and the virtual machine; and the virtualization software includes a streaming control module and presents the virtual disk to the virtual machine as a physical disk.

9. The tangible machine-readable medium of claim 7, wherein the method further comprises:

upon determining that a requested disk block should be streamed, identifying a network resource from which to obtain contents corresponding to the requested disk block, the identifying of the network resource comprising accessing a data structure that maps the disk block to a remote network address from which the content corresponding to the disk block can be streamed.

10. The tangible machine-readable medium of claim 9, wherein the data structure that maps the disk block to the remote network address is a hash table.

11. The tangible machine-readable medium of claim 7, wherein the data structure comprises a bit value corresponding to each disk block of the virtual disk, each bit value indicating whether a corresponding disk block assigned to the application does not contain any executable code or data.

12. The tangible machine-readable medium of claim 7, wherein the modified image of the application comprises a plurality of files and at least one of the files contains executable code or data of the application.

13. A computer system configured to execute an application in a virtual machine running on the computer system, wherein the virtual machine accesses a virtual disk and the computer system comprises a processor configured to perform the steps of:

installing a modified image of the application onto a file system of the virtual disk, wherein the modified image does not contain executable code or data of the application;

updating, during the installation of the modified image, a data structure maintained by a virtual machine monitor (VMM) of the virtual machine to indicate that contents for each disk block allocated by the file system to store portions of the modified image of the application that should contain executable code or data should be streamed from a remote location; and consulting the data structure by the VMM upon a request of a disk block during execution of the application in the virtual machine to determine whether to stream the content from a remote location.

14. The computer system of claim 13, wherein:

the computer system comprises virtualization software logically residing and interfacing between a physical host platform and the virtual machine; and the virtualization software includes a streaming control module and presents the virtual disk to the virtual machine as a physical disk.

15. The computer system of claim 13, wherein the processor is further configured to perform the step of:

upon determining that a requested disk block should be streamed, identifying a network resource from which to obtain contents corresponding to the requested disk block, the identifying of the network resource comprising accessing a data structure that maps the disk block to a remote network address from which the content corresponding to the disk block can be streamed.

16. The computer system of claim 15, wherein the data structure that maps the disk block to the remote network address is a hash table.

17. The computer system of claim 13, wherein the data structure comprises a bit value corresponding to each disk block of the virtual disk, each bit value indicating whether a corresponding disk block assigned to the application does not contain any executable code or data.

18. The computer system of claim 13, wherein the modified image of the application comprises a plurality of files and at least one of the files contains executable code or data of the application.

\* \* \* \* \*